(12) United States Patent
Sinclair et al.

(10) Patent No.: US 7,035,851 B1
(45) Date of Patent: Apr. 25, 2006

(54) REORGANIZATION OF DATABASE RECORDS USING PARTITION MERGING

(75) Inventors: Paul L. Sinclair, Manhattan Beach, CA (US); Kuorong Chiang, Cerritos, CA (US)

(73) Assignee: NCR Corp., Dayton, OH (US)

( * ) Notice: Subject to any disclaimer, the term of this patent is extended or adjusted under 35 U.S.C. 154(b) by 356 days.

(21) Appl. No.: 10/017,406

(22) Filed: Dec. 7, 2001

(51) Int. Cl.
*G06F 17/30* (2006.01)
*G06F 7/00* (2006.01)
*G06F 12/00* (2006.01)

(52) U.S. Cl. ............................. 707/7; 707/1; 707/200; 707/3

(58) Field of Classification Search ................. 707/7, 707/3, 200, 1
See application file for complete search history.

(56) References Cited

U.S. PATENT DOCUMENTS

| | | | | |
|---|---|---|---|---|
| 5,121,494 | A * | 6/1992 | Dias et al. ....................... | 707/2 |
| 5,765,146 | A * | 6/1998 | Wolf et al. ...................... | 707/2 |
| 5,794,229 | A * | 8/1998 | French et al. ................... | 707/2 |
| 6,067,547 | A * | 5/2000 | Douceur ....................... | 707/100 |
| 6,073,129 | A * | 6/2000 | Levine et al. ................... | 707/4 |
| 6,223,182 | B1 * | 4/2001 | Agarwal et al. ............. | 707/102 |
| 6,240,428 | B1 * | 5/2001 | Yeung et al. ................ | 707/206 |
| 6,366,911 | B1 * | 4/2002 | Christy ........................... | 707/7 |
| 6,678,701 | B1 * | 1/2004 | Garth et al. ................. | 707/201 |
| 6,772,163 | B1 * | 8/2004 | Sinclair et al. ............. | 707/100 |

OTHER PUBLICATIONS

Goetz Graefe, "Query Evalution techniques for large databases", ACM computing surveys, vol. 25, No. 2, Jun. 1993.*
Goetz Graefe, "Query Evalution techniques for large databases", ACM computing serveys, vol. 25, No. 2, Jun. 1993.*
Goetz Graefe, "Query Evalution techniques for large databases", ACM computing serveys, vol. 25, No. 2, Jun. 1993.*

* cited by examiner

*Primary Examiner*—Frantz Coby
*Assistant Examiner*—Cindy Nguyen
(74) *Attorney, Agent, or Firm*—Baker Botts LLP

(57) ABSTRACT

A method for reorganizing rows from a partitioned database table is disclosed. The partitioned database table includes a plurality of populated partitions. Rows are organized in each of the populated partitions in accordance with a first value associated with each row. A file context is created for each partition of a subset of the populated partitions, each file context stores at least location data for a row in the partition and the first value associated with the row. Rows and merged from the subset of partitions into a single first-merge partition in order of the first value associated with each row. The creation of file contexts and merging of rows in the corresponding partitions is repeated until the subsets have included all populated partitions.

53 Claims, 12 Drawing Sheets

REORGANIZATION OF DATABASE RECORDS USING PARTITION MERGING

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common query. If the data is properly organized, performance can be improved by searching a part of the data for queries that can take advantage of that organization. If the data is not organized in any way, it will often need to be searched in its entirety to satisfy a query or copied and restructured into a useful organization. When a query is received that does not take advantage of the data's current organization, one option for executing the query involves reorganizing the data. The efficiency of such reorganization can then impact the efficiency of the query execution.

Given a particular change in the initial organization of data, particular types of reorganizations may be adversely impacted in terms of efficiency if they are performed without any adjustment. Many factors may be addressed to adjust a reorganization type that is to be performed with respect to a new initial organization of data. Such factors include but are not limited to the manner in which the data is stored, the file system that identifies the location of the data and various other information about the data, and the desired outcome of the reorganization. The efficiency of a reorganization can be improved by considering and addressing one or more of those factors.

SUMMARY

In general, in one aspect the invention includes a method for reorganizing rows from a partitioned database table. The partitioned database table includes a plurality of populated partitions. Rows are organized in each of the populated partitions in accordance with a first value associated with each row. A file context is created for each partition of a subset of the populated partitions. Each file context stores at least location data for a row in the partition and the first value associated with the row. Rows are merged from the subset of partitions into a single first-merge partition in order of the first value associated with each row. The creation of file contexts and merging of rows in the corresponding partitions is repeated until the subsets have included all populated partitions.

In general, in another aspect, the invention includes a database system for reorganizing rows from a partitioned database table. The partitioned database table includes a plurality of populated partitions. The system includes one or more nodes and a plurality of CPUs. Each of the one or more nodes provides access to one or more CPUs. The system includes a plurality of virtual processes. Each of the one or more CPUs provides access to one or more virtual processes. Each virtual process is configured to manage data, including rows from the partitioned database table, stored in one of a plurality of data-storage facilities. A partition merging component is configured to reorganize rows from the partitioned database table in each data-storage facility. The partition merging component organizes rows in each of the populated partitions in accordance with a first value associated with each row. The partition merging component creates a file context for each partition of a subset of the populated partitions. Each file context stores at least location data for a row in the partition and the first value associated with the row. The partition merging component merges rows from the subset of partitions into a single first-merge partition in order of the first value associated with each row. The creation of file contexts and merging of rows in the corresponding partitions is repeated until the subsets have included all populated partitions.

In general, in another aspect, the invention includes a computer program, stored in a tangible medium, for reorganizing rows from a partitioned database table. The program includes executable instructions that cause a computer to organize rows in each of the populated partitions in accordance with a first value associated with each row. A file context is created for each partition of a subset of the populated partitions. Each file context stores at least location data for a row in the partition and the first value associated with the row. Rows are merged from the subset of partitions into a single first-merge partition in order of the first value associated with each row. The creation of file contexts and merging of rows in the corresponding partitions is repeated until the subsets have included all populated partitions.

In general, in one aspect the invention includes a method for reorganizing rows from a partitioned database table. The partitioned database table includes a plurality of populated partitions. Rows are organized in each of the populated partitions in accordance with a first value associated with each row. A file context is created for each partition of a subset of the populated partitions. Each file context stores at least location data for a row in the partition and the first value associated with the row. Rows are merged from the subset of partitions into a single first-merge partition in order of the first value associated with each row. The subset of partitions are no longer counted as populated partitions. The creation of file contexts and merging of rows in the corresponding partitions is repeated until the remaining populated partitions are no more than a specified number.

Other features and advantages will become apparent from the description and claims that follow.

DETAILED DESCRIPTION

Figure 1:
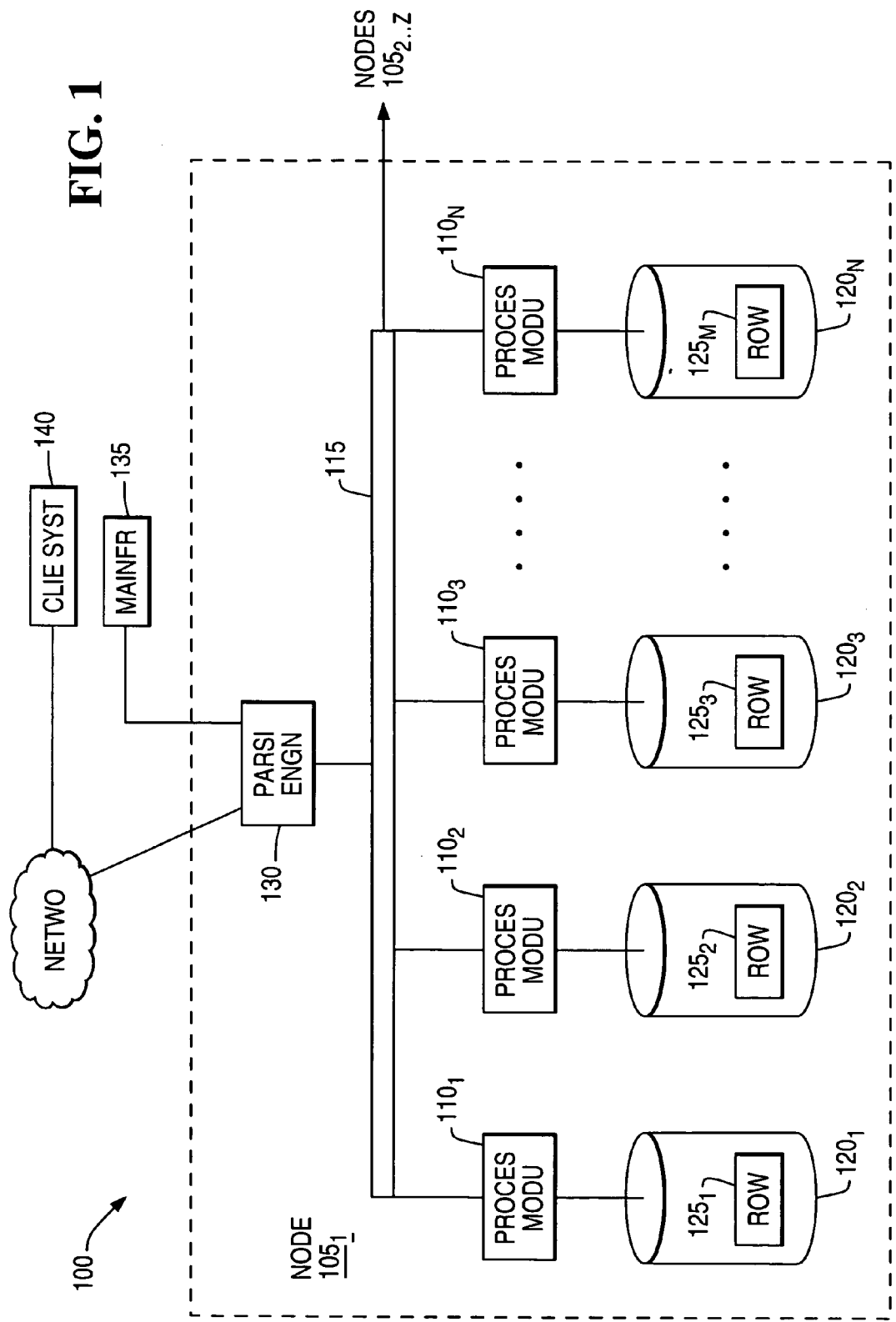
FIG. 1 is a block diagram of a node of a parallel processing system.

The partition merging reorganization technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node 105$_1$ of the DBS 100. The DBS node 105$_1$ includes one or more processing modules 110$_{1 \ldots N}$, connected by a network 115, that manage the storage and retrieval of data in data-storage facilities 120$_{1 \ldots N}$. Each of the processing modules 110$_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 110$_{1 \ldots N}$ manages a portion of a database that is stored in a corresponding one of the data-storage facilities 120$_{1 \ldots N}$. Each of the data-storage facilities 120$_{1 \ldots N}$ includes one or more disk drives. The DBS may include multiple nodes 105$_{2 \ldots N}$ in addition to the illustrated node 105$_1$, connected by extending the network 115.

The system stores data in one or more tables in the data-storage facilities 120$_{1 \ldots N}$. The rows 125$_{1 \ldots Z}$ of the tables are stored across multiple data-storage facilities 120$_{1 \ldots N}$ to ensure that the system workload is distributed evenly across the processing modules 110$_{1 \ldots N}$. A parsing engine 130 organizes the storage of data and the distribution of table rows 125$_{1 \ldots Z}$ among the processing modules 110$_{1 \ldots N}$. The parsing engine 130 also coordinates the retrieval of data from the data-storage facilities 120$_{1 \ldots N}$ in response to queries received from a user at a mainframe 135 or a client computer 140. The DBS 100 usually receives queries and commands to build tables in a standard format, such as SQL.

In one implementation, the rows 125$_{1 \ldots Z}$ are distributed across the data-storage facilities 120$_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 120$_{1 \ldots N}$ and associated processing modules 110$_{1 \ldots N}$ by a hash bucket map. The characteristics of the columns chosen for the primary index determine how evenly the rows are distributed.

In one implementation, nodes are defined physically, in that the processors and storage facilities associated with a node are generally physically proximate as well. For this reason, it is possible that a hardware or software problem encountered by a node will result in the unavailability of the processor and storage resources associated with that node.

Figure 2:
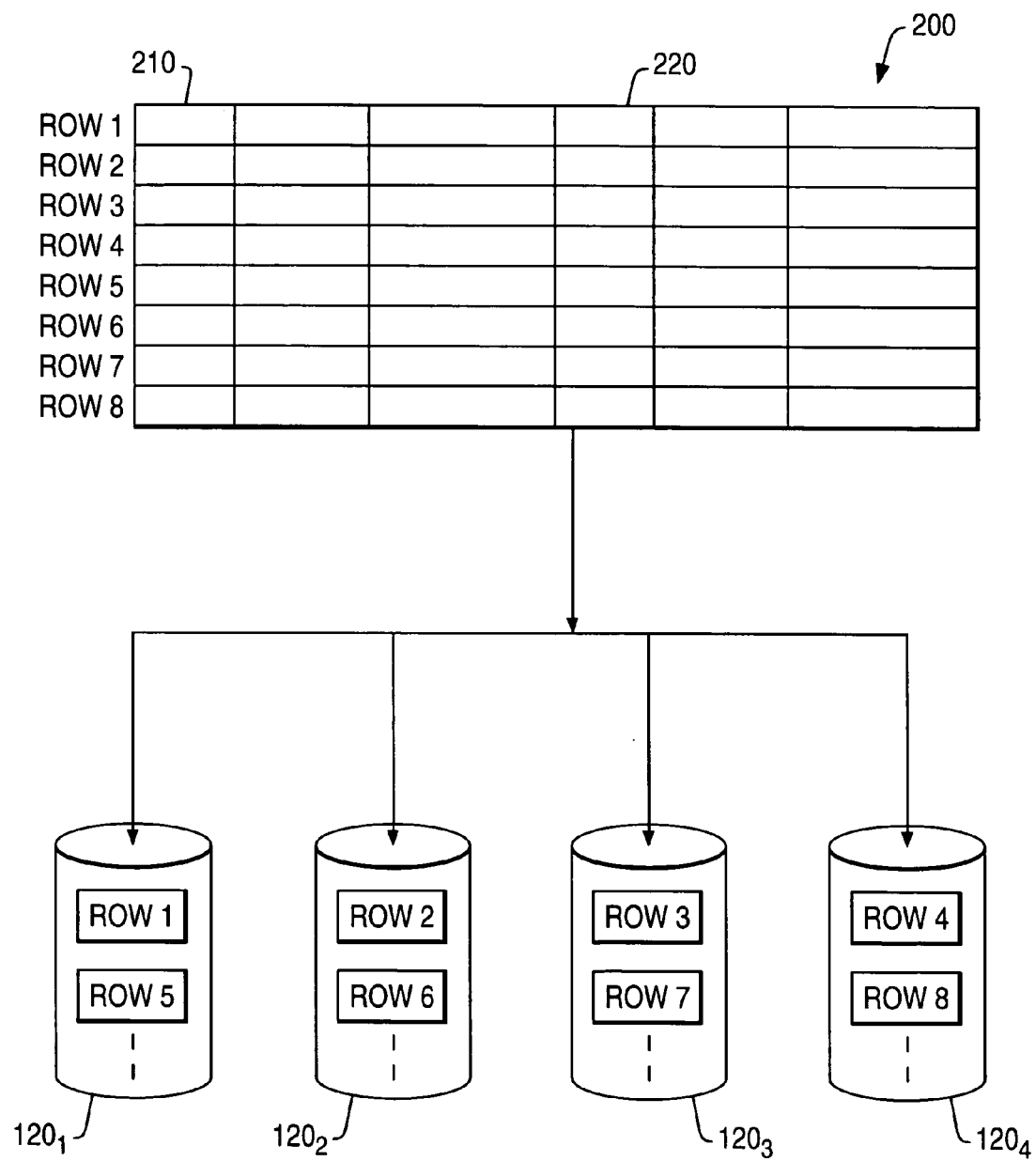
FIG. 2 is a flow diagram of a table distribution process.

FIG. 2 shows one implementation of how the rows of a table are distributed. The table 200 contains a plurality of rows and is stored in a plurality of data storage facilities 120$_{1-4}$ by the parsing engine 130, shown in FIG. 1. For example, two columns 210, 220 can be designated as the primary index when the table is created. The hash function is then applied to the contents of columns 210, 220 for each row. The hash bucket portion of the resulting hash value is mapped to one of the data storage facilities 120$_{1-4}$ and the row is stored in that facility. For example, if the primary index indicates a column containing a sequential row number and the hash function is the sum of the value one and the remainder when the sequential row number is divided by four, the first eight rows will be distributed as shown in FIG. 2.

Queries involving the values of columns in the primary index can be efficiently executed because the processing module 110$_n$ having access to the data storage facility 120$_n$ that contains the row can be immediately determined. For example, referring to FIG. 2, if values from row 2 are desired, the parsing engine 130 can apply the hashing function to determine that only processing module 110$_2$ needs to be used. As another example, an equality join between two tables that have the same primary index columns is more efficient. All of the rows that need to be joined are found in the same data storage facility 120$_n$ and no movement of information from rows between the data storage facilities is necessary.

Figure 3:
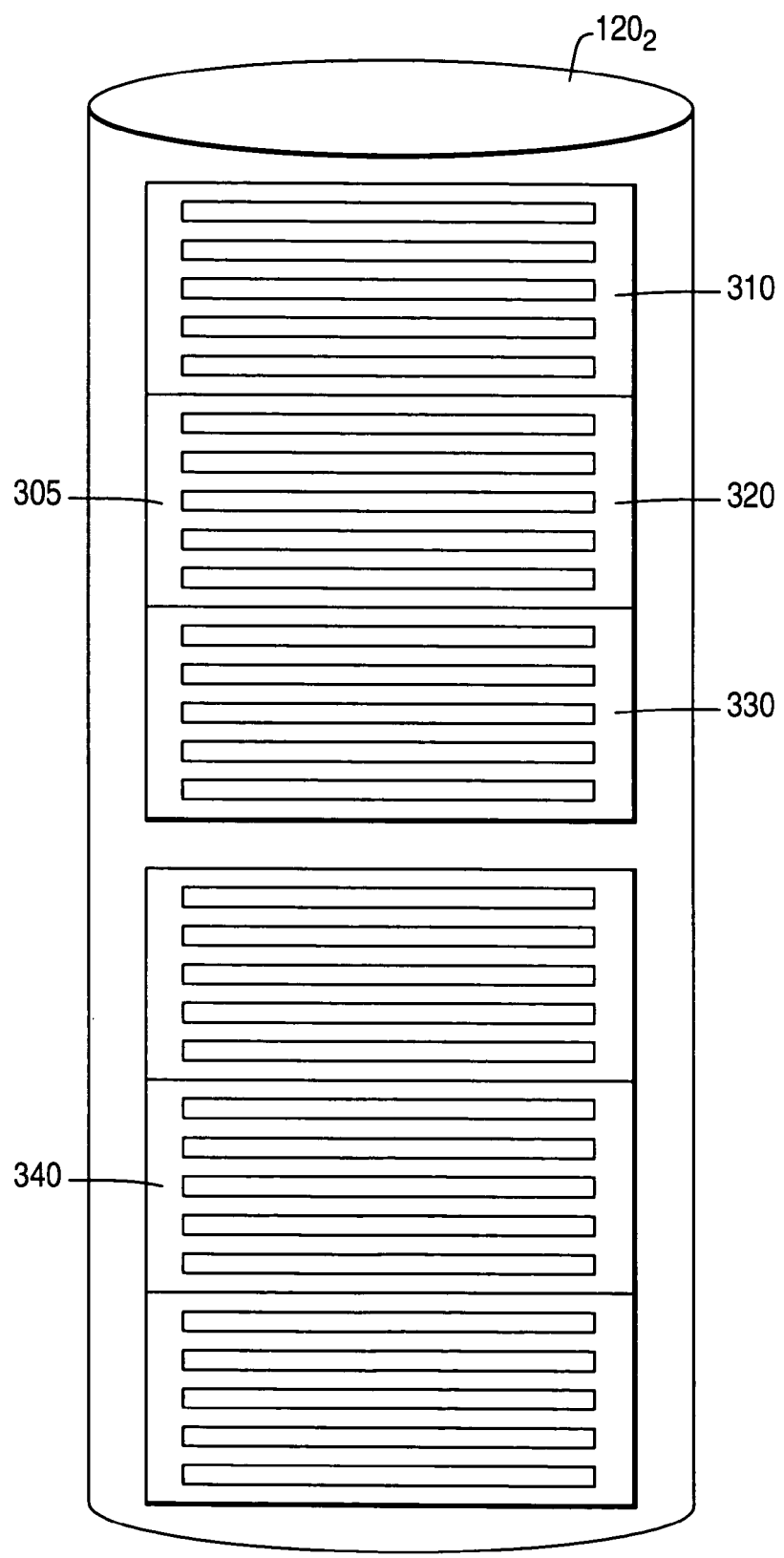
FIG. 3 illustrates an example of rows from two partitioned primary index tables residing in a data storage facility.

While the primary index of a table can be chosen for equality joins, for example the order number column of an order table, additional design features can make range searches, for example a range of dates from the date column, more efficient. Referring to FIG. 3, a partitioned database storage facility 120$_2$ is shown. Rows from two partitioned tables 305 and 340 are organized within the storage facility 120$_2$ in accordance with a row identification (row ID) that can include values associated with a partition function as well as values associated with the hash function and a uniqueness value. The rows stored in the storage facility 120$_2$ are ordered at a top level by the result of the partition function. As a result, a first group of rows 310 has one partition function value. A second group of rows 320 has another partition function value. A third group of rows 330 has a third partition value. The groups 310, 320, 330 are ordered by their partition values and are also known as partitions.

The rows are also ordered within each partition. For example, the first partition 310 contains five rows. Those rows are stored within that partition 310 in the order of the hash result for each row. The hash result therefore acts as a sorting or ordering value. A uniqueness value is also maintained for each row. In one implementation, no two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value does not play a role in ordering rows that have different partition or hash values. In another implementation, uniqueness values are not assigned to the rows and the order of rows with identical hash values is not determined.

A partition function can return a number for a row based on the range of values into which that row's value in a certain column falls. For example, if an order table in a database has the order number column as that table's primary index, the partition function can correspond to the month of the order date. In that situation, the rows of the order table would be distributed to storage facilities based on the result of applying the hash function to the order number. In each storage facility, the rows would be ordered based on a monthly range of dates. For example, the first partition 310 could include all rows for orders in January 2001. The second partition 320 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two month period is desired, only two partitions would need to be checked for the specified product. The monthly range is just one example of a possible partition function. Any type of function can be used.

For one implementation of executing a query in a DBS 100, the rows specified by the query, for example by the use of conditions or constraints regarding the values in columns of those rows, are to be ordered in accordance with the hash value for each row. In another implementation, the rows are to be organized in a number of groups less than or equal to some maximum number of groups where each group contains rows ordered by hash value. Operations such as joins and aggregations operate more efficiently if the rows are in one of the above-described organizations.

In one implementation of a DBS table with a partitioned primary index, the rows in each storage facility are ordered, on a top level, by a value different from the hash value. In one implementation, the value corresponds to particular ranges of dates in one column of the table. As a result, rows with the same hash value may be stored separately rather than together as they would be if they were ordered only by hash. For example, a partitioned primary index order table can specify an order_number column as the primary index column while specifying months of an order_date column as the values for partitioning rows in storage facilities. The rows of such an order table would be distributed to data storage facilities based on the result of applying the hash function to the order number for each row. Within each data storage facility, however, the rows would be organized in partitions corresponding to the month of the order date for each row. The rows in a given partition are organized according to hash value. One option in conventional systems for executing a join or aggregate command specifying a condition on the primary index columns in such a table is to copy the table rows from each data storage facility and sort the copied rows by hash so that the operation can be performed on the sorted copy. That conventional option is sometimes inefficient, because it does not take advantage of the already present grouped sorting of rows in a partitioned primary index table.

Figure 4:
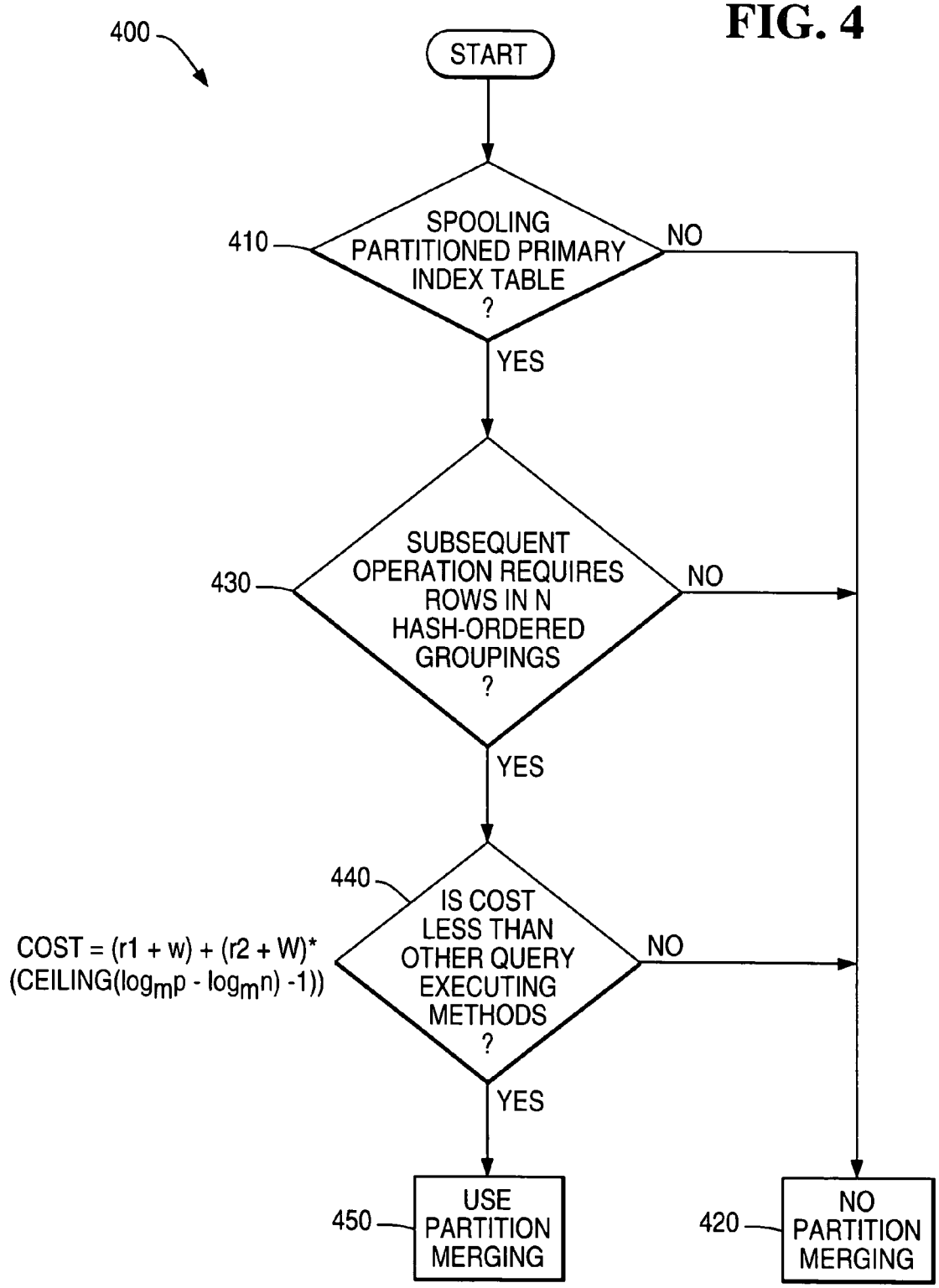
FIG. 4 is a flow diagram of a query execution selection process.

As depicted in FIG. 4, one implementation of a query execution selection process 400 includes evaluating several conditions. In this particular implementation if any of the conditions are not met, the partition merge process will not be selected 420 and a different approach is used to implement the query. The query execution sequence, the steps necessary to determine the answer to the query, is checked to see if it includes copying rows of the partitioned primary index table to a spool 410. Such copying can be referred to as spooling. The query execution sequence is also checked to see if an operation on the spooled rows will require that those rows be organized in a maximum number of hash-ordered groupings 430. The variable n is used to refer to the maximum number of hash-ordered groupings. The estimated cost of utilizing partition merging is compared to other methods of executing the query 440. One possible formula for calculating an estimate of the cost of partition merging is:

$$\text{cost}=(r1+w)+((r2+w)*(\text{ceiling}(\log_m p-\log_m n)-1)) \quad (1)$$

In formula (1), r1 is the cost to read and qualify rows in non-eliminated partitions, w is the cost to write qualifying rows to a spool, r2 is the cost to read the rows in the spool, m is the number of partitions in a subset, p is the number of populated partitions in the table, and ceiling returns an integral argument rounding up. For example, ceiling(4)=4 and ceiling(4.1)=5. If the query execution sequence requires that the rows be organized by hash in a single group, formula (1) simplifies to:

$$\text{cost}=(r1+w)+((r2+w)*(\text{ceiling}(\log_m p)-1)) \quad (2)$$

If the cost for partition merging is the least available cost, partition merging will be used 450. In alternate embodiments, partition merging can be used under other circumstances. For example, partition merging could be used when it is not the least cost method, but uses less memory than the least cost method.

Figure 5:
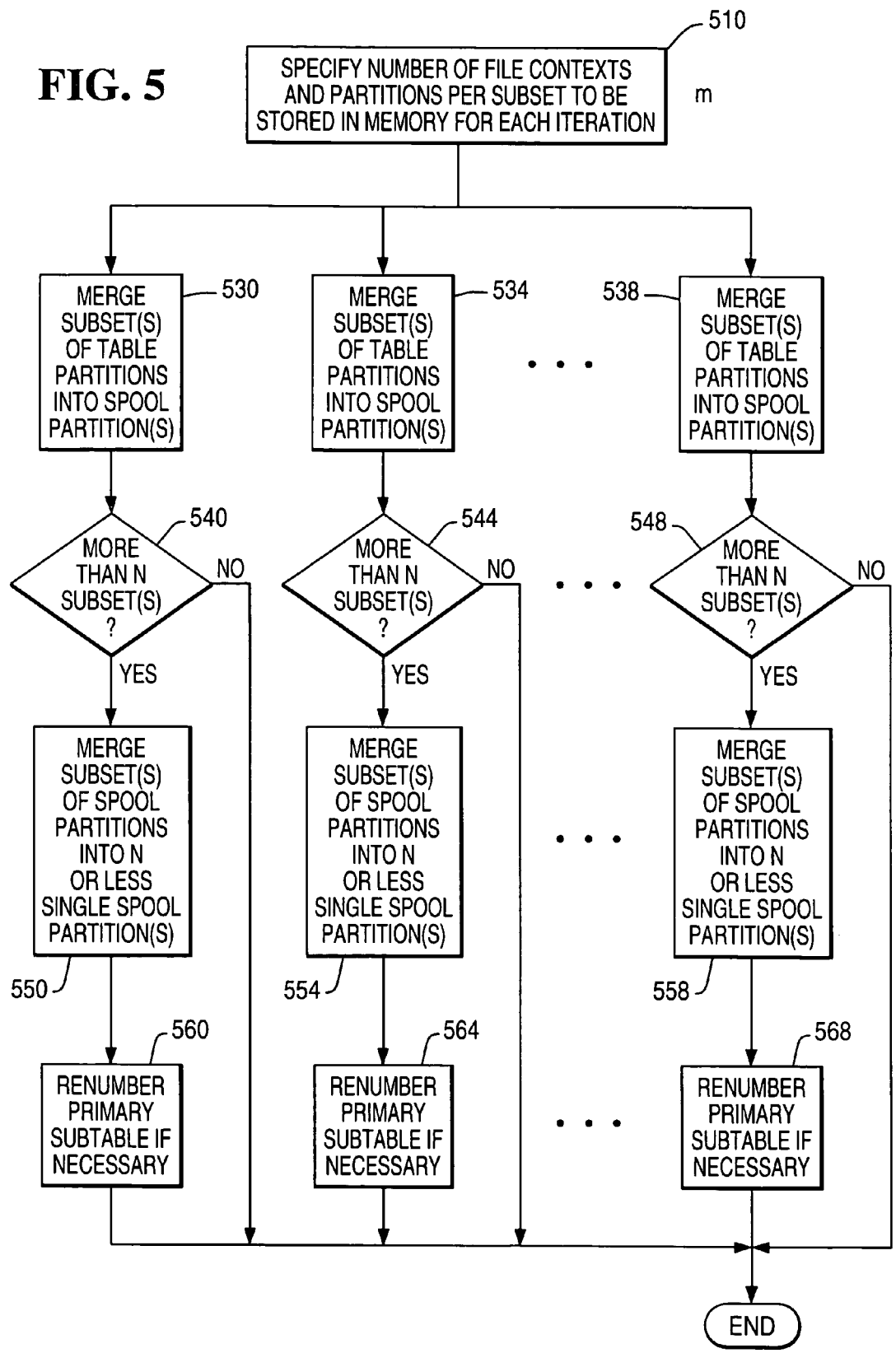
FIG. 5 is a flow diagram of a partition merging process.

FIG. 5 is a flow diagram of a partition merging process. In one implementation, the partition merging process is applied only to selected queries. The number of file contexts and partitions per subset to be stored in memory for each iteration is specified as m 510. That limit can be determined based on the amount of memory, the amount of anticipated users, and other factors. The partition merging process is carried out in each processing module associated with a data storage facility containing at least one row of the partitioned table 530, 534, 538 (described in additional detail in FIGS. 6, 11, and 12).

If there are more than n subsets of table partitions merged into spool partitions 540, 544, 548, the partition merging process continues in a spool 550, 554, 558 (described in additional detail in FIGS. 7–12). If the spool merging results in partitions located in a different subtable than the primary subtable, the primary subtable is renumbered or adjusted 560, 564, 568. In one implementation, each processing module has a spooled grouping of rows from the partitioned table that meet the query conditions and are ordered by hash. In one implementation, each processing module has fewer than n+1 spooled groupings of rows from the partitioned table that meet the query conditions and are ordered by hash.

Figure 6:
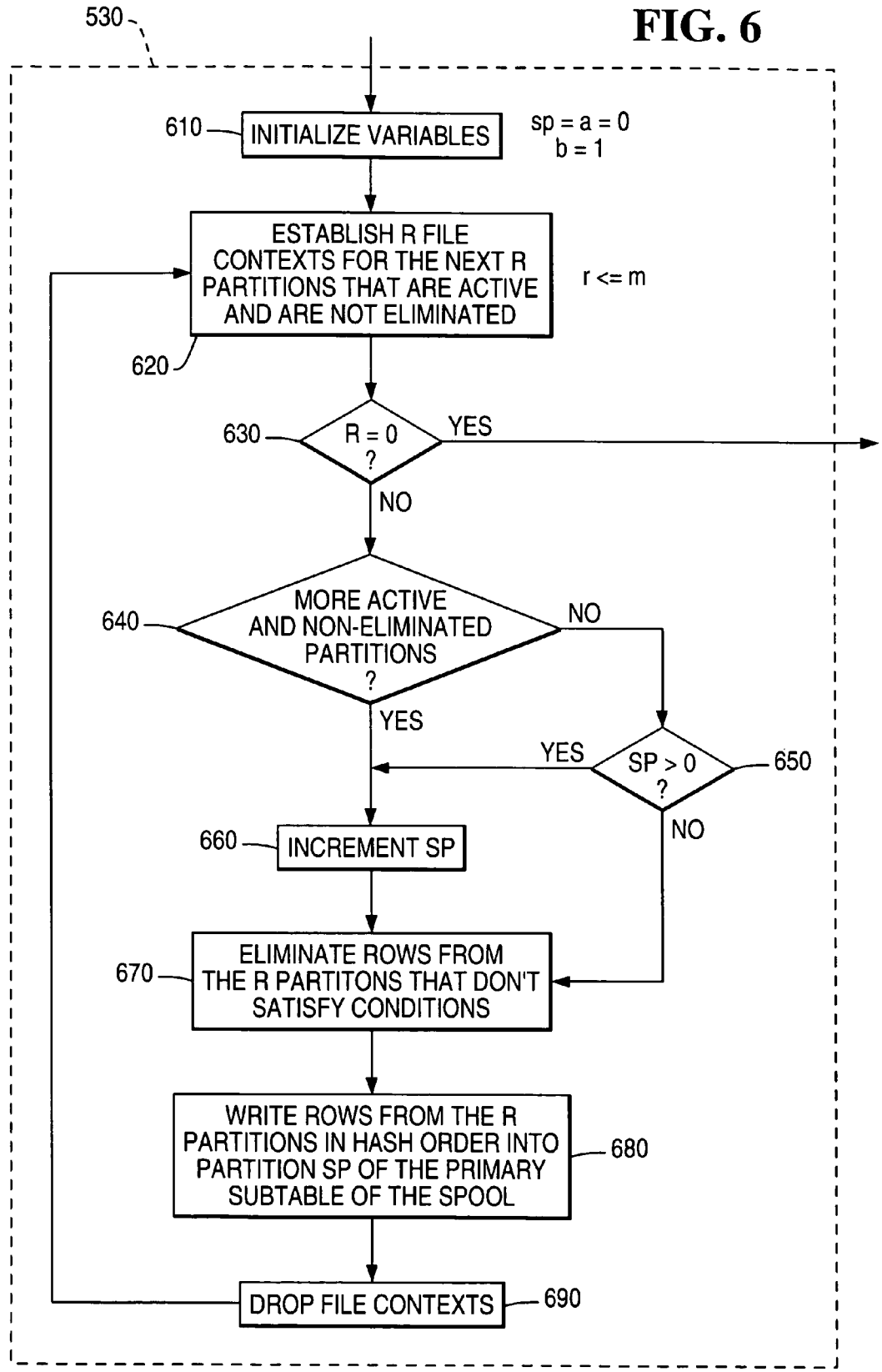
FIG. 6 is a flow diagram of a table-to-spool partition merging subprocess.

FIG. 6 is a flow diagram of a table to spool merge subprocess 530. The subprocess for other processing modules, for example processing module 1102, can follow the same approach with respect to rows of the partitioned table in the data storage facility associated with that processing module. The subprocess initializes three variables: sp=0, a=0, and b=1. The variable sp keeps track of the current partition into which rows are merged. The variables a and b keep track of the source and destination subtables during the spool merge subprocess 550.

File contexts are then established for active, non-eliminated partitions 620. The number of such file contexts, r, has to be no more than the specified limit m. If fewer than m partitions remain, r will be less than m. Otherwise, in one implementation, r will generally be equal to m. If there are no such partitions, r is zero. The r partitions are a subset of the populated partitions of the table present in that storage facility. An active, non-eliminated partition is also referred to as a populated partition. In one implementation, rows are read in groups according to the file system in which the rows are stored. For example, rows of the partitioned table can be stored as blocks in the data storage facility. In one implementation, file contexts for all the populated partitions are established.

The iterations end once there are no remaining partitions 630. That state can be detected because r will be set to zero. If there are still table partitions, r>1, the iteration is performed on the partitions associated with the file contexts. If their are additional active and non-eliminated partitions beyond those associated with the file contexts 640 or if sp is greater than zero 650, sp is incremented by one 660. If neither of those conditions is present, the increment is skipped. The conditions of the query, if there are any conditions, for the rows of the partitioned table are used to eliminate those rows in the r partitions that don't meet them 670. The remaining rows from the r partitions are written, using the file contexts, into partition sp of the primary subtable of the spool 680. The file contexts are then removed from memory 690. The iterations continue until all the populated partitions have been merged into spool partitions.

Figure 7:
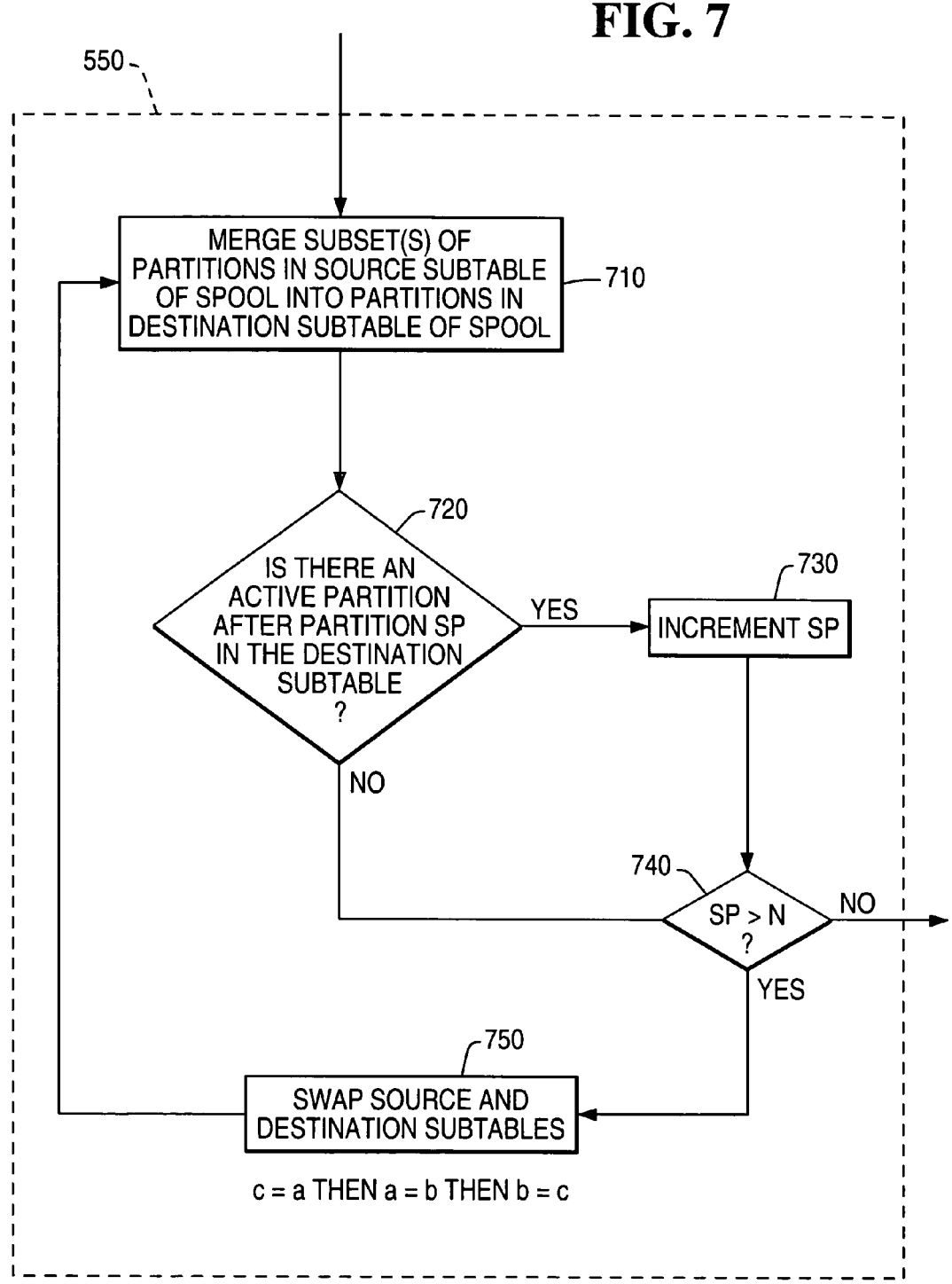
FIG. 7 is a flow diagram of an intra-spool partition merging subprocess.

FIG. 7 is a flow diagram of an intra-spool partition merging subprocess 550. The partitions that have been written on the spool are designated as a source subtable and subsets thereof are merged in hash order into partitions of a destination subtable of the spool 710 (described in additional detail in FIGS. 8 and 9). If there is an active partition after partition sp in the destination subtable 720, sp is incremented by one 730. Otherwise that increment step is skipped. If sp>n 740, additional merging is performed and the source and destination subtables are swapped by changing the variables that identify those subtables 750. Once the swap has occurred, another intra-spool iteration is performed 710. Once an iteration results in sp equal to no more than n, the spool partitions have reached the required number.

Figure 8:
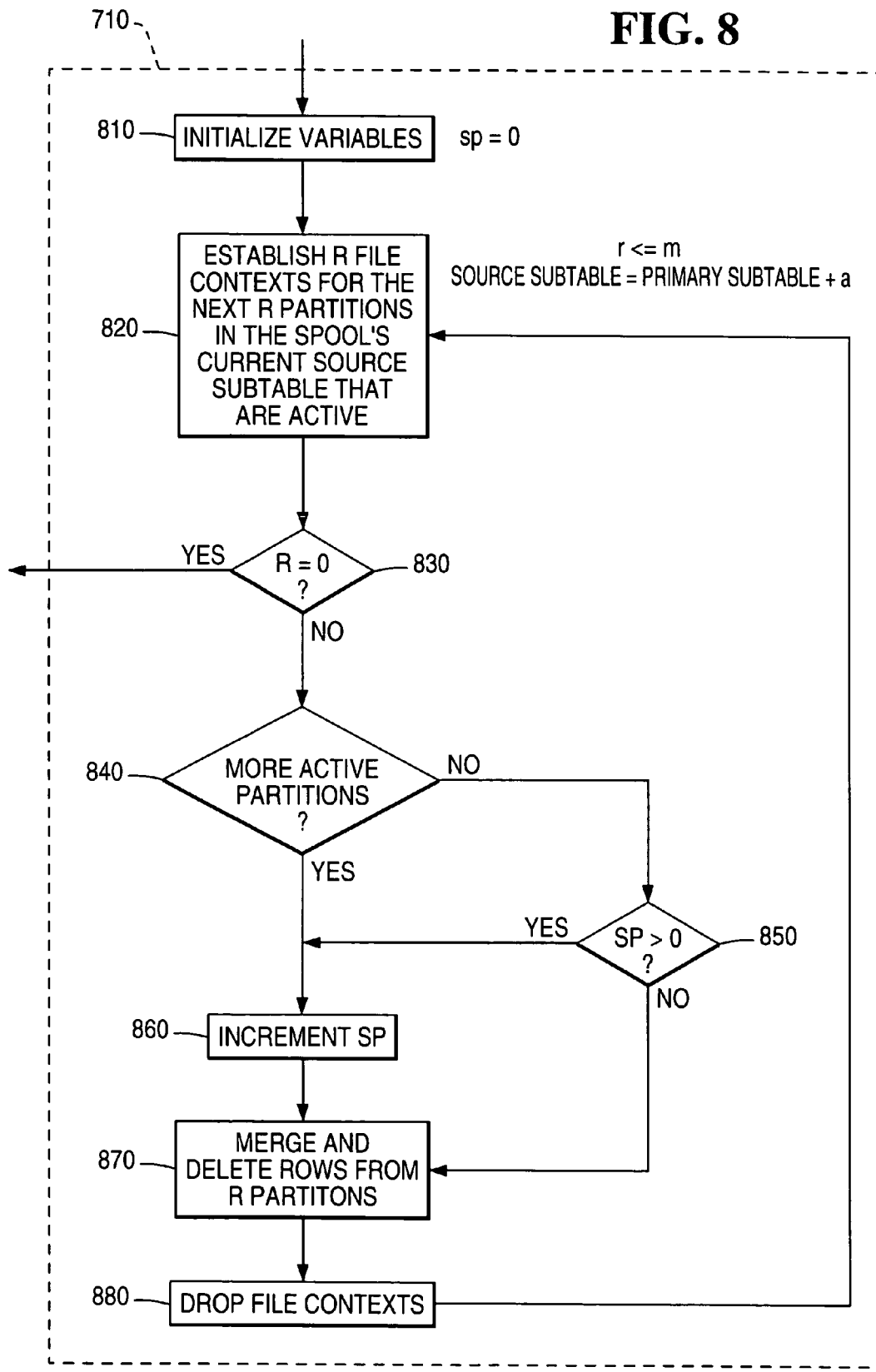
FIG. 8 is a flow diagram of an intra-spool partition merge.

FIG. 8 is a flow diagram of an intra-spool partition merge 710. The variable that tracks the number of destination partitions, sp, is initialized as zero 810. File contexts are then established for active partitions in the source subtable 820. The source subtable is the primary subtable of the spool plus the variable a. The eliminated partitions were not transferred to the spool. The number of such file contexts, r, has to be no more than the specified limit m. If fewer than m partitions remain, r will be less than m. Otherwise, in one implementation, r will generally be equal to m. If there are no such partitions, r is zero. The r partitions are a subset of active partitions stored in the source subtable of the spool.

The iterations end once there are no remaining source subtable partitions 830. That state can be detected because r will be set to zero. If there are still source partitions, r>1, the iteration is performed on the partitions associated with the file contexts. If there are additional active partitions beyond those associated with the file contexts in the source subtable 840 or if sp is greater than zero 850, sp is incremented by one 860. If neither of those conditions is present, the increment is skipped.

The rows in the r partitions are then merged in hash order using the file contexts into a single partition in the destination subtable of the spool 870. The destination subtable is the primary subtable of the spool plus the variable b. The rows are deleted once they have been copied 870. The file contexts are removed once the merging is complete 880. The intra-spool merge continues until all the source subtable partitions have been merged into destination subtable partitions.

Figure 9:
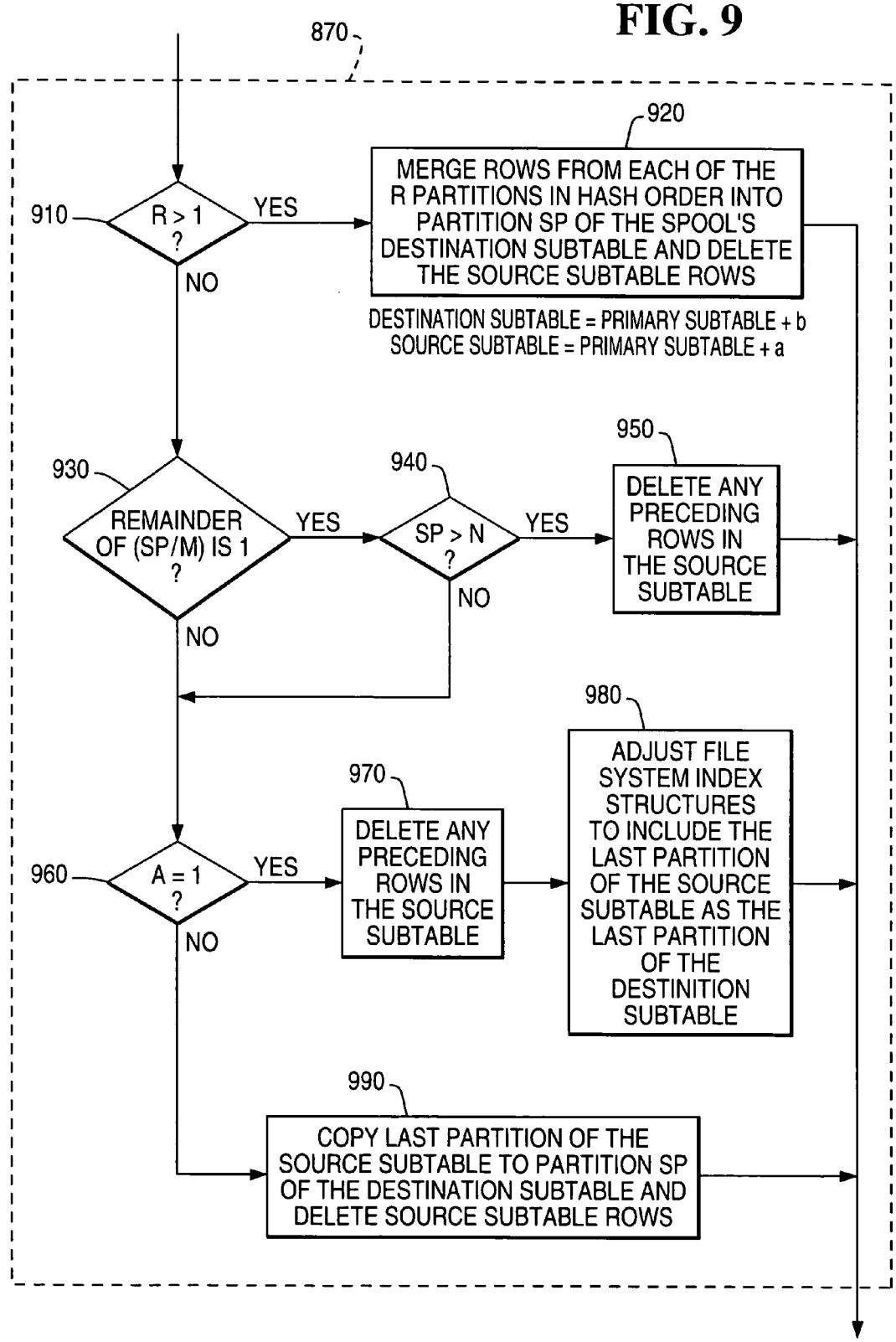
FIG. 9 is a flow diagram of a merge substitution subprocess.

FIG. 9 is a flow diagram of a merge substitution subprocess 870. If r is greater than one 910, the merge occurs as previously described with the rows of the source subtable partitions written in hash order into a destination subtable partition 920. If r is not greater than one 910, it must be equal to one because the merge substitution subprocess 870 occurs after a check for r being equal to zero 830.

If another intra-spool merge is required, because sp>n 940, and that merge will also result in a single leftover partition, because the remainder of sp/m equals one 930, the partition is left in the source subtable and not written to the destination subtable, because it would only be written back during the next merge. Any preceding rows in the source subtable are deleted 950.

If those two conditions 930, 940 are not met, and the current source subtable is one greater than the primary subtable 960, preceding rows are deleted 970 and the file system index structure is adjusted to include the last partition of the source subtable as the last partition of the destination subtable 980. This avoids the need to copy the rows. If none of the conditions are met, the rows are copied to a partition of the destination subtable 990.

Figure 10:
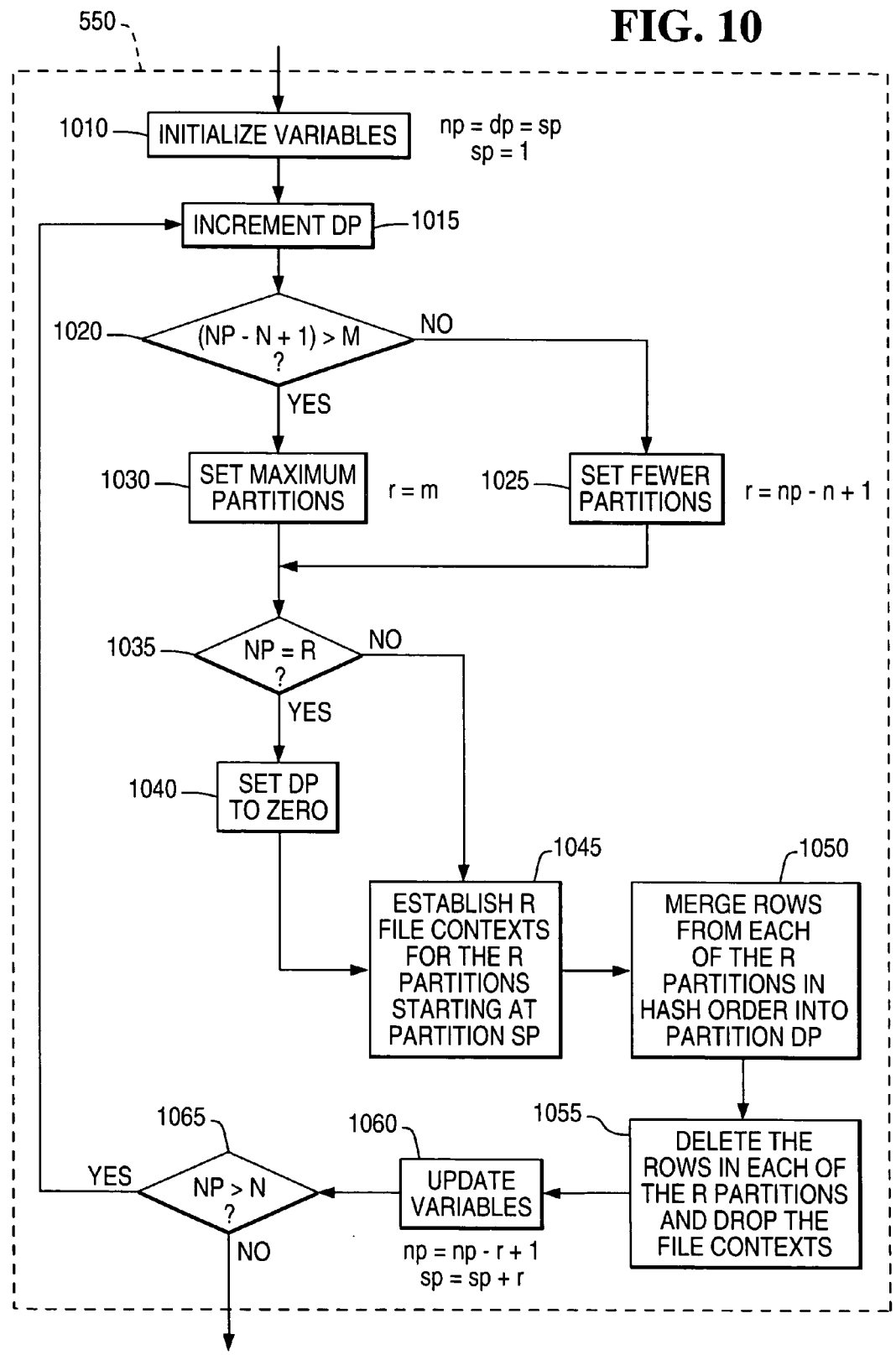
FIG. 10 is a flow diagram of an intra-spool partition merging subprocess.

FIG. 10 is a flow diagram of an intra-spool partition merging subprocess 550. The process is a different implementation than that shown in FIG. 7 One implementation of the process of FIG. 7 is reflected in the partitions of FIG. 11, while one implementation of the process of FIG. 10 is reflected in the partitions of FIG. 12. Variables are initialized 1010 including setting np and dp equal to the current value of sp and then resetting sp to the value one. The variable dp is then incremented 1015. If a merge of the maximum number of partitions would not result in less than the desired number of groups 1020, shown mathematically as m<(np−n−1), then the number of partitions to be merged r is set at the maximum m for the iteration 1030. If such a result would occur, the number of partitions to be merged r is set at the number needed to achieve the desired number of partitions n after the iteration 1025. Mathematically represented as:

$$r = np - n + 1 \qquad (3)$$

Once the number of partitions to be merged r is determined, the variable np is compared to that number 1035. If they are equal, dp is reset to zero 1040. This allows a final merge to be located at the initial partition of the spool. The calculated number r of file contexts for the r partitions starting at partition sp are then established 1045. Rows from each of those partitions are then merged in hash order into partition dp 1050. The merged rows are deleted from their original partitions and the file contexts are dropped/removed 1055. The variables are updated to reflect the results of the iteration 1060. The starting partition sp is moved to the partition after the ones that have been merged and the remaining number of partitions np is reduced by the amount of partitions merged except for the one produced. If the number of remaining partitions still exceeds the desired number of partitions, the process repeats 1065.

Figure 11:
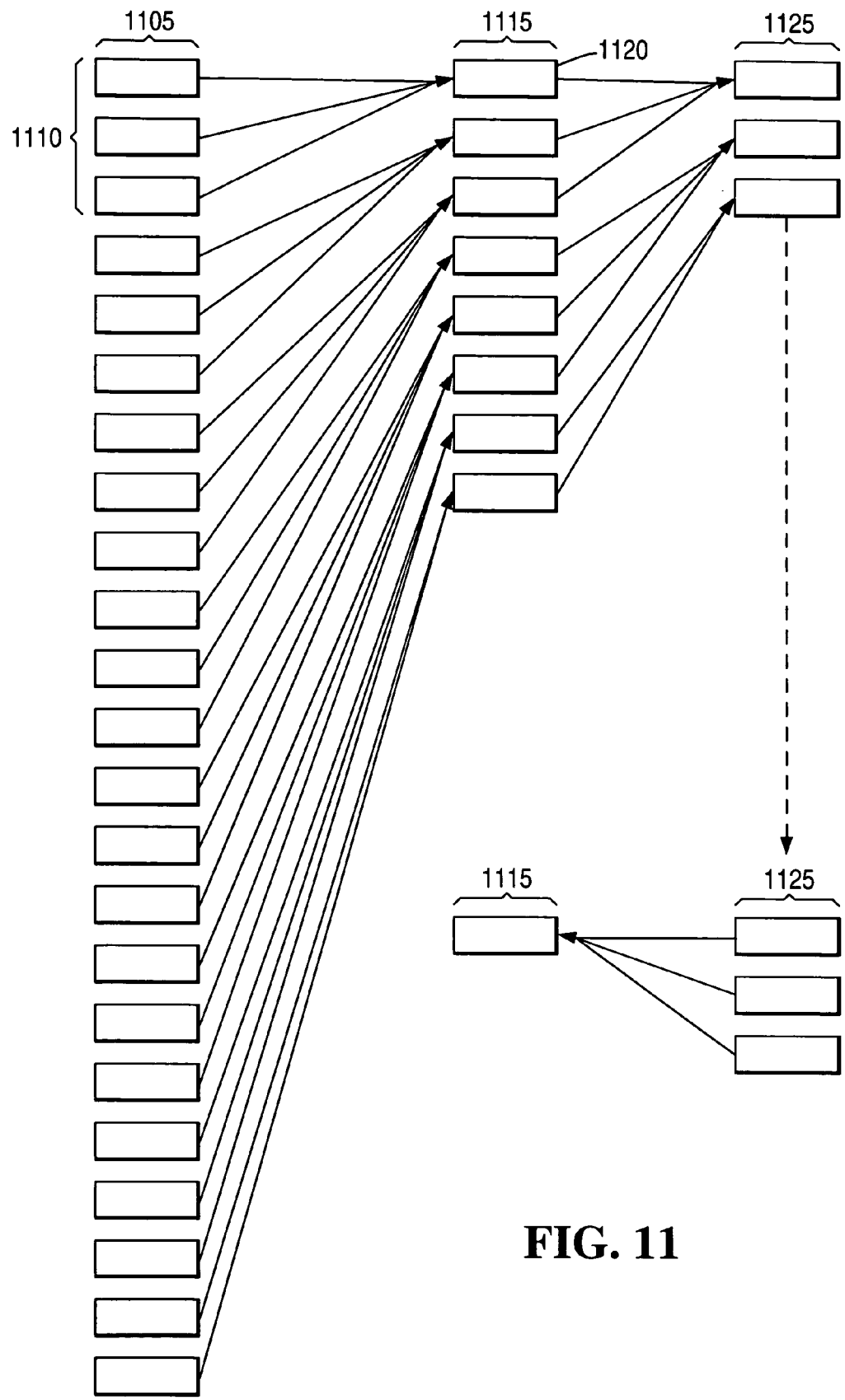
FIG. 11 is a block diagram of partitions merging in one implementation of the invention.

FIG. 11 is a block diagram of partitions merging in one implementation of the invention. Specifically, the partition merge structure corresponds to one implementation of FIG. 7. The partitions of the partitioned table 1105 are storage in data storage facilities. Specifying m as three for this example, each group of three partitions are merged into a partition in the primary subtable of the spool 1115. An example of three partitions being merged is 1110. The last two partitions are merged, because there are not three available at that point. Mathematically, r<m. The partitions 1120 in the primary subtable of the spool 1115, are then merged into partitions in the next subtable of the spool 1125. Assuming that less than three hash-ordered grouping are required, an addition merge to a single partition in the primary subtable 1115 is performed.

Figure 12:
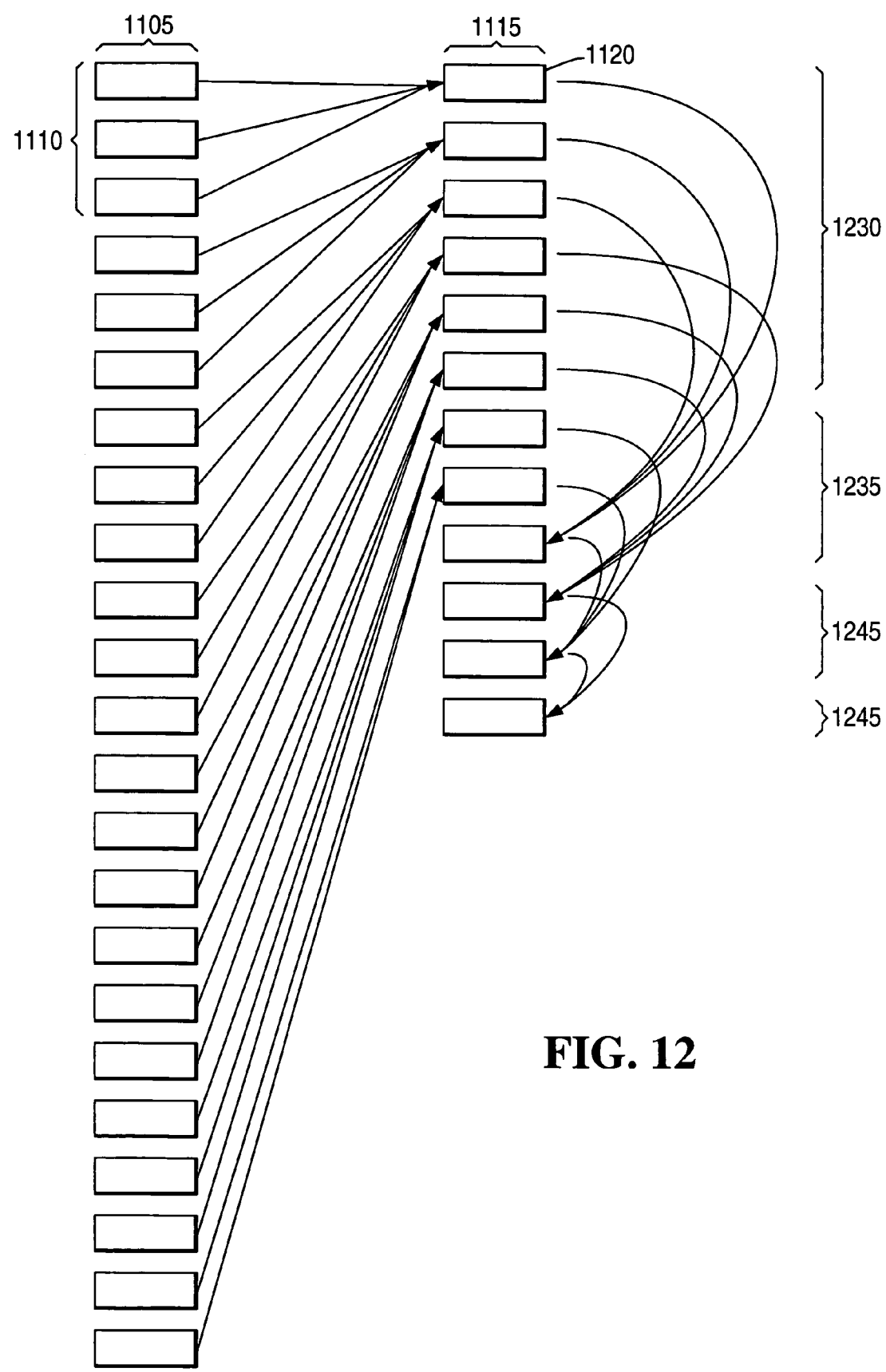
FIG. 12 is a block diagram of partitions merging in another implementation of the invention.

FIG. 12 is a block diagram of partitions merging in one implementation of the invention. Specifically, the partition merge structure corresponds to one implementation of FIG. 10. The partitions of the partitioned table 1105 are storage in data storage facilities. Specifying m as three for this example, each group of three partitions are merged into a partition in the primary subtable of the spool 1115. An example of three partitions being merged is 1110. The last two partitions are merged, because there are not three available at that point. Mathematically, r<m. The partitions 1120 in the primary subtable of the spool 1115, are then merged into partitions in the same subtable of the spool. Thus two subsets of three partitions 1230 are merged into two partitions. The next subset of three, including a merge result partition, 1235 is merged into a partition. Two partitions 1240 are merged because they are the only ones left resulting in a single grouping of hash ordered rows 1245.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A computer-implemented method for reorganizing rows from a partitioned database table, the partitioned database table including a plurality of populated partitions, comprising the steps of:
   a. organizing rows in each of the populated partitions in accordance with a first value associated with each row;
   b. creating a file context for each partition of a subset of the populated partitions, each file context storing at least location data for a row in the partition and the first value associated with the row;
   c. merging rows from the subset of partitions into a single first-merge partition in order of the first value associated with each row;
   d. repeating steps b through c until the subsets have included all populated partitions.

2. The method of claim 1, further comprising the step of:
   e. comparing a specified grouping limit to the number of first-merge partitions and merging the first-merge partitions if the specified grouping limit is less than the number.

3. The method of claim 1, wherein the location data for a row is the location of a block of rows that includes the row.

4. The method of claim 1, wherein steps a through c are performed on rows in a single data-storage facility.

5. The method of claim 1, wherein the file contexts are stored in memory.

6. The method of claim 1, wherein the rows of the first-merge partitions are stored separately from the rows of the populated partitions of the partitioned database table.

7. The method of claim 1, further comprising the steps of:
   a'. determining whether rows from a partitioned primary index table are being spooled;
   a". determining whether a subsequent operation requires the spooled rows to be ordered in accordance with the first value associated with each row; and
   a'". performing steps b through d only if both determinations, a' and a", are true.

8. The method of claim 1, wherein the specified grouping limit is 1.

9. The method of claim 8, wherein first-merge partitions and spool-merge partitions are contained in different subtables of a spool.

10. The method of claim 8, wherein step j includes merging rows from the subset of spool-merge partitions, each located in a first subtable of a spool, into a new spool-merge partition, located in a second subtable of the spool.

11. The method of claim 1, further comprising the steps of:
   e. creating a file context for each first-merge partition of a subset of the first-merge partitions, each file context storing at least location data for a row in the partition and the first value associated with the row;
   f. merging rows from the subset of first-merge partitions into a spool-merge partition in order of the first value associated with each row;
   g. repeating steps e and f until the subsets have included all first-merge partitions;
   h. bypassing steps i through k if a specified grouping limit is at least equal to the number of spool-merge partitions;
   i. creating a file context for each spool-merge partition of a subset of the spool-merge partitions, each file context storing at least location data for a row in the partition and the first value associated with the row;
   j. merging rows from the subset of spool-merge partitions into a new spool-merge partition in order of the first value associated with each row;
   k. repeating steps i and j until the specified grouping limit is at least equal to the number of remaining spool-merge partitions.

12. The method of claim 1, wherein the subsets of partitions contain no more than a specified number of populated partitions and the specified number is determined by memory usage.

13. The method of claim 1, further comprising the step of:
   a'. calculating the cost of reorganizing rows from a partitioned database table using the equation cost=(r1+w)+((r2+w)*(ceiling($\log_m p$)−1)), wherein r1 is the cost to read and qualify rows in non-eliminated partitions, w is the cost to write qualifying rows to a spool, r2 is the cost to read the rows in the spool, m is the number of partitions in a subset, p is the number of populated partitions in the table, and ceiling returns an integral argument rounding up.

14. The method of claim 1, wherein the reorganization is conducted in response to a query having conditions and the step of merging rows includes eliminating rows that do not satisfy the query conditions.

15. The method of claim 1, wherein the first subset of the populated partitions includes all the populated partitions and steps b and c are not repeated.

16. The method of claim 1, wherein the first value is the result of a hash function applied to one or more values in one or more columns of the associated row.

17. A database system for reorganizing rows from a partitioned database table, the partitioned database table including a plurality of populated partitions, the system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the partitioned database table, stored in one of a plurality of data-storage facilities;
a partition merging component employing at least one of the plurality of virtual processes and configured to reorganize rows from the partitioned database table in each data-storage facility by:
a. organizing rows in each of the populated partitions in accordance with a first value associated with each row;
b. creating a file context for each partition of a subset of the populated partitions, each file context storing at least location data for a row in the partition and the first value associated with the row;
c. merging rows from the subset of partitions into a single first-merge partition in order of the first value associated with each row;
d. repeating steps b through c until the subsets have included all populated partitions.

18. The database system of claim 17, wherein the partition merging component reorganizes rows by:
e. comparing a specified grouping limit to the number of first-merge partitions and merging the first-merge partitions if the specified grouping limit is less than the number.

19. The database system of claim 17, wherein the location data for a row is the location of a block of rows that includes the row.

20. The database system of claim 17, wherein the file contexts are stored in memory.

21. The database system of claim 17, wherein the rows of the first-merge partitions are stored separately from the rows of the populated partitions of the partitioned database table.

22. The database system of claim 17, wherein the partition merging component reorganizes rows by:
a'. determining whether rows from a partitioned primary index table are being spooled;
a''. determining whether a subsequent operation requires the spooled rows to be ordered in accordance with the first value associated with each row, and
a'''. performing steps b through d only if both determinations, a' and a'', are true.

23. The database system of claim 17, wherein the specified grouping limit is 1.

24. The database system of claim 23, wherein first-merge partitions and spool-merge partitions are contained in different subtables of a spool.

25. The database system of claim 23, wherein step j includes merging rows from the subset of spool-merge partitions, each located in a first subtable of a spool, into a new spool-merge partition, located in a second subtable of the spool.

26. The database system of claim 17, wherein the partition merging component reorganizes rows by:
e. creating a file context for each first-merge partition of a subset of the first-merge partitions, each file context storing at least location data for a row in the partition and the first value associated with the row;
f. merging rows from the subset of first-merge partitions into a spool-merge partition in order of the first value associated with each row;
g. repeating steps e and f until the subsets have included all first-merge partitions;
h. bypassing steps i through k if a specified grouping limit is at least equal to the number of spool-merge partitions;
i. creating a file context for each spool-merge partition of a subset of the spool-merge partitions, each file context storing at least location data for a row in the partition and the first value associated with the row,
j. merging rows from the subset of spool-merge partitions into a new spool-merge partition in order of the first value associated with each row;
k. repeating steps i and j until the specified grouping limit is at least equal to the number of remaining spool-merge partitions.

27. The database system of claim 17, wherein the subsets of partitions contain no more than a specified number of populated partitions and the specified number is determined by memory usage.

28. The database system of claim 17, wherein the partition merging component reorganizes rows by:
a'. calculating the cost of reorganizing rows from a partitioned database table using the equation $cost=(r1+w)+((r2+w)*(ceiling(log_m p)-1))$, wherein r1 is the cost to read and qualify rows in non-eliminated partitions, w is the cost to write qualifying rows to a spool, r2 is the cost to read the rows in the spool, m is the number of partitions in a subset, p is the number of populated partitions in the table, and ceiling returns an integral argument rounding up.

29. The database system of claim 17, wherein the reorganization is conducted in response to a query having conditions and the step of merging rows includes eliminating rows that do not satisfy the query conditions.

30. The database system of claim 17, wherein the first subset of the populated partitions includes all the populated partitions and steps b and c are not repeated.

31. The database system of claim 17, wherein the first value is the result of a hash function applied to one or more values in one or more columns of the associated row.

32. A computer program, stored in a tangible medium, for reorganizing rows from a partitioned database table, the program comprising executable instructions that cause a computer to:
a. organize rows in each of the populated partitions in accordance with a first value associated with each row;
b. create a file context for each partition of a subset of the populated partitions, each file context storing at least location data for a row in the partition and the first value associated with the row;
c. merge rows from the subset of partitions into a single first-merge partition in order of the first value associated with each row;
d. repeat steps b through c until the subsets have included all populated partitions.

33. The computer program of claim 32, wherein the executable instructions cause the computer to:

e. compare a specified grouping limit to the number of first-merge partitions and merging the first-merge partitions if the specified grouping limit is less than the number.

34. The computer program of claim 32, wherein the location data for a row is the location of a block of rows that includes the row.

35. The computer program of claim 32, wherein steps a through c are performed on rows in a single data-storage facility.

36. The computer program of claim 32, wherein the file contexts are stored in memory.

37. The computer program of claim 32, wherein the rows of the first-merge partitions are stored separately from the rows of the populated partitions of the partitioned database table.

38. The computer program of claim 32, wherein the executable instructions cause the computer to:
   a'. determine whether rows from a partitioned primary index table are being spooled;
   a''. determine whether a subsequent operation requires the spooled rows to be ordered in accordance with the first value associated with each row; and
   a'''. perform steps b through d only if both determinations, a' and a''', are true.

39. The computer program of claim 32, wherein the executable instructions cause the computer to:
   e. create a file context for each first-merge partition of a subset of the first-merge partitions, each file context storing at least location data for a row in the partition and the first value associated with the row;
   f. merge rows from the subset of first-merge partitions into a spool-merge partition in order of the first value associated with each row;
   g. repeat steps e and f until the subsets have included all first-merge partitions;
   h. bypass steps i through k if the rows from the populated partitions are contained in one partition in order of the first value associated with each row,
   i. create a file context for each spool-merge partition of a subset of the spool-merge partitions, each file context storing at least location data for a row in the partition and the first value associated with the row;
   j. merge rows from the subset of spool-merge partitions into a new spool-merge partition in order of the first value associated with each row;
   k. repeat steps i and j until the rows from the populated partitions are contained in one partition in order of the first value associated with each row.

40. The computer program of claim 39, wherein first-merge partitions and spool-merge partitions are contained in different subtables of a spool.

41. The computer program of claim 39, wherein step j includes merging rows from the subset of spool-merge partitions, each located in a first subtable of a spool, into a new spool-merge partition, located in a second subtable of the spool.

42. The computer program of claim 32, wherein the executable instructions cause the computer to:
   e. create a file context for each first-merge partition of a subset of the first-merge partitions, each file context storing at least location data for a row in the partition and the first value associated with the row;
   f. merge rows from the subset of first-merge partitions into a spool-merge partition in order of the first value associated with each row;
   g. repeat steps e and f until the subsets have included all first-merge partitions;
   h. bypass steps i through k if a specified grouping limit is at least equal to the number of spool-merge partitions;
   i. create a file context for each spool-merge partition of a subset of the spool-merge partitions, each file context storing at least location data for a row in the partition and the first value associated with the row,
   j. merge rows from the subset of spool-merge partitions into a new spool-merge partition in order of the first value associated with each row;
   k. repeat steps i and j until the specified grouping limit is at least equal to the number of remaining spool-merge partitions.

43. The computer program of claim 32, wherein the subsets of partitions contain no more than a specified number of populated partitions and the specified number is determined by memory usage.

44. The computer program of claim 32, wherein the executable instructions cause the computer to:
   a'. calculate the cost of reorganizing rows from a partitioned database table using the equation $cost=(r1+w)+((r2+w)*(ceiling(\log_m p)-1))$, wherein r1 is the cost to read and qualify rows in non-eliminated partitions, w is the cost to write qualifying rows to a spool, r2 is the cost to read the rows in the spool, m is the number of partitions in a subset, p is the number of populated partitions in the table, and ceiling returns an integral argument rounding up.

45. The computer program of claim 32, wherein the reorganization is conducted in response to a query having conditions and the step of merging rows includes eliminating rows that do not satisfy the query conditions.

46. The computer program of claim 32, wherein the first subset of the populated partitions includes all the populated partitions and steps b and c are not repeated.

47. The computer program of claim 32, wherein the first value is the result of a hash function applied to one or more values in one or more columns of the associated row.

48. A method for reorganizing rows from a partitioned database table, the partitioned database table including a plurality of populated partitions, comprising the steps of:
   a. organizing rows in each of the populated partitions in accordance with a first value associated with each row;
   b. creating a file context for each partition of a subset of the populated partitions, each file context storing at least location data for a row in the partition and the first value associated with the row;
   c. merging rows from the subset of partitions into a new populated partition in order of the first value associated with each row, the subset of partitions no longer being counted as populated partitions;
   d. repeating steps b through c until no more than a specified number of populated partitions remain.

49. The method of claim 48, wherein steps a through c are performed on rows in a single data-storage facility.

50. The method of claim 48, further comprising the steps of:
   a'. determining whether rows from a partitioned primary index table are being spooled;
   a''. determining whether a subsequent operation requires that the spooled rows be stored in groups ordered in accordance with the first value associated with each row;
   a'''. determining whether a subsequent operation requires that the spooled rows be stored in a number of groups no more than a specified grouping limit;

a''''. performing steps b through d only if the three determinations, a', a'', and a''', are true.

51. The method of claim 48, wherein the subsets of partitions contain no more than a specified number of populated partitions and the specified number is determined by memory usage.

52. The method of claim 48, further comprising the step of:
   a'. calculating the cost of reorganizing rows from a partitioned database table using the equation cost=(r1+w)+((r2+w)*(ceiling($\log_m p - \log_m n$)−1)), wherein r1 is the cost to read and qualify rows in non-eliminated partitions, w is the cost to write qualifying rows to a spool, r2 is the cost to read the rows in the spool, m is the number of partitions in a subset, p is the number of populated partitions in the table, n is the specified number, and ceiling returns an integral argument rounding up.

53. The method of claim 48, wherein the first value is the result of a hash function applied to one or more values in one or more columns of the associated row.

* * * * *